May 12, 1964 N. E. LENTZ 3,133,208

NON-SATURATING TRANSISTOR BLOCKING OSCILLATOR

Filed Dec. 29, 1961

INVENTOR
N. E. LENTZ
BY R. B. Ardis
ATTORNEY

United States Patent Office 3,133,208
Patented May 12, 1964

3,133,208
NON-SATURATING TRANSISTOR BLOCKING OSCILLATOR

Norman E. Lentz, Haverhill, Mass., assignor to Bell Telephone Laboratories, Incorporated, New York, N.Y., a corporation of New York Filed Dec. 29, 1961, Ser. No. 163,305
6 Claims. (Cl. 307—88.5)

Figure 1:
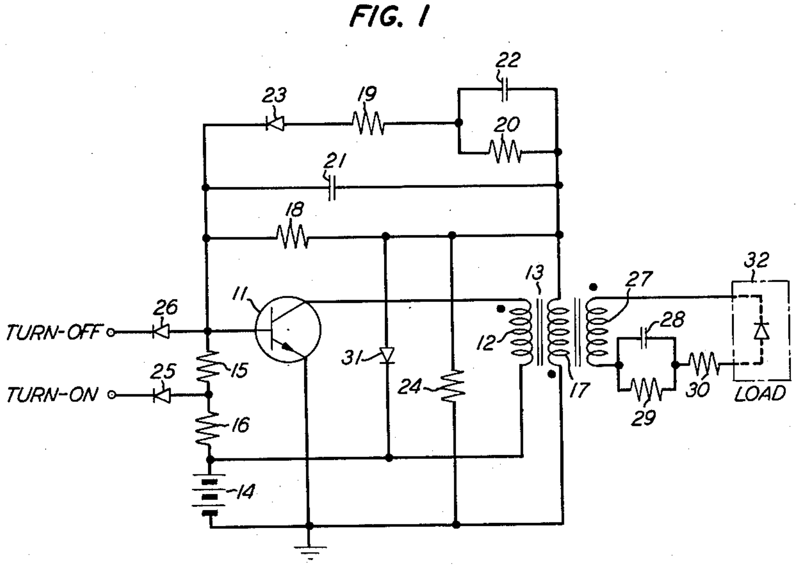

This invention relates generally to transistor switching circuits and more particularly to circuit arrangements for keeping the transistors in transistor blocking oscillators out of saturation.

In high-speed transistor switching circuits such as blocking oscillators, it is frequently desirable to minimize the effects of charge carrier storage on transistor turn-off time by limiting the excursions of the transistor collector voltage to a level short of the saturation point. There are a number of arrangements for accomplishing this end in transistor blocking oscillators, but those existing in the prior art either are relatively complex or require additional power sources and tend to be wasteful of power.

One object of the invention, therefore, is to keep the transistor in a transistor blocking oscillator out of saturation in as simple a manner as possible.

Another and more particular object is to prevent the transistor in a transistor blocking oscillator from saturating without using more than a single power source.

Still another object of the invention is to avoid saturation in a transistor blocking oscillator with a minimum amount of power drain from the blocking oscillator power source.

The invention makes use of one of the windings of the feedback transformer of a transistor blocking oscillator to catch the transistor collector voltage short of the saturation point. In accordance with the invention, a winding other than the collector winding is clamped to the collector voltage supply source and the turns ratio and phase between that winding and the collector winding combine to limit transistor collector voltage excursions to something short of the point of saturation. The collector voltage supply source itself is used to determine the limiting voltage level, eliminating any need for additional voltage sources, and the clamp current is returned to the collector voltage supply to reduce the current drain from it.

In a number of important embodiments of the invention, the feedback winding of the transistor blocking oscillator transformer is the winding clamped to the collector supply. A step-down turns ratio and the phase from the feedback winding to the collector winding cooperate to maintain at least a minimum potential difference across the transistor output electrodes at all times. In other embodiments, the winding clamped to the collector supply is a third winding of the transformer, such as an output winding.

Figure 2:
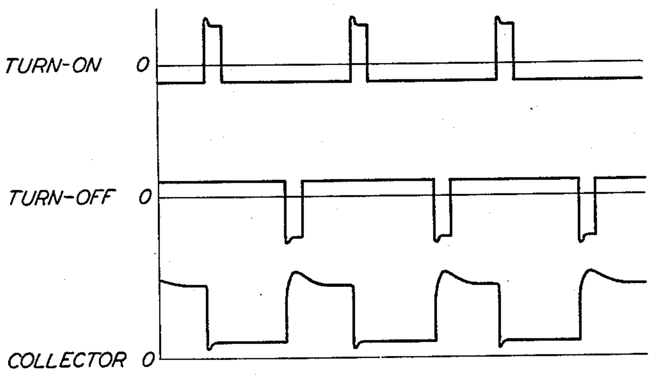

A more complete understanding of the invention may be obtained from a study of the following detailed description of one specific embodiment. In the drawing:

FIG. 1 illustrates an embodiment of the invention in which the feedback winding is employed to catch the transistor collector voltage short of the point of saturation; and FIG. 2 illustrates typical turn-on, turn-off, and collector voltage waveforms encountered in the operation of the embodiment of the invention shown in FIG. 1.

The embodiment of the invention illustrated in FIG. 1 is a transistor blocking oscillator arranged to be turned on and off by external timing pulses and to supply a capacitive load. As illustrated, a transistor 11 is connected in the so-called common-emitter circuit configuration with its emitter electrode grounded. The collector electrode of transistor 11 serves as the transistor output electrode in this configuration, while the base electrode serves as the transistor input electrode. The collector winding 12 of the blocking oscillator transformer 13 is connected between the collector electrode of transistor 11 and a collector voltage supply source 14. The other side of source 14 is grounded and source 14 is poled in the direction of positive current flow (i.e., in the direction of the arrow in the conventional transistor symbol) between the transistor collector and emitter electrodes. For a transistor of the n-p-n type, source 14 is poled, as illustrated, to supply a collector voltage that is positive with respect to ground. The base electrode of transistor 11 is supplied with turn-on current from the ungrounded side of source 14 through a resistor 16 under the control of a diode switch 25. This turn-on current flows through a resistor 15 connected between resistor 16 and the base electrode of transistor 11.

Positive feedback in the particular blocking oscillator illustrated in FIG. 1 is provided by a feedback winding 17 of transformer 13 and a feedback network which includes resistors 18, 19, and 20, capacitors 21 and 22, and diode 23. Because the common-emitter transistor circuit configuration provides a phase reversal between transistor base and collector electrodes, transformer 13 provides another phase reversal from collector winding 12 to feedback winding 17. Resistor 18 and capacitor 21 are connected in parallel between one side of feedback winding 17 and the base electrode of transistor 11, while the other side of feedback winding 17 is grounded. A third shunt path from winding 17 to the base electrode is provided by the serial combination of resistors 19 and 20 and diode 23. Resistor 20 is itself shunted by capacitor 22, and diode 23 is poled for easy current flow in the direction of forward base-emitter current in transistor 11. A direct-current shunt for feedback winding 17 is provided by a resistor 24.

The input and output connections for the blocking oscillator illustrated in FIG. 1 are provided by a pair of diodes 25 and 26 and an output winding 27 of transformer 13. For a transistor of the illustrated conductivity type, positive-going turn-on pulses which rise from a slightly negative quiescent level are applied to the junction between resistors 15 and 16 through a diode 25 poled oppositely to the direction of forward base-emitter current. Negative-going turn-off pulses are applied in a similar manner directly to the base electrode of transistor 11 through a similarly poled diode 26. Winding 27 provides an output connection to a rectifying load 32 through a network consisting of a pair of series resistors 29 and 30 and a capacitor 28 connected in parallel with resistor 29.

Examples of the turn-on and turn-off pulses applied to the base electrode of transistor 11 through diodes 25 and 26 are illustrated in the top two lines of FIG. 2. When transistor 11 is non-conducting in its internal collector-emitter path, a positive-going turn-on pulse at diode 25 back biases diode 25 and permits direct voltage source 14 to place a forward base-emitter bias on transistor 11. As current flows into the base of transistor 11, transistor 11 begins to turn on or, in other words, to switch to a conducting condition in its internal collector-emitter path. This condition is maintained by positive feedback through transformer 13 from the transistor collector electrode back to the base.

The operation of the blocking oscillator specifically illustrated in FIG. 1 differs from its repetitive running condition during the first few cycles because of the nature of its load. During the first few cycles of operation, capacitor 28 in the output circuit must be charged. Until it is charged, capacitor 28 presents a high impedance load and requires relatively high current from the blocking oscillator. To deliver this high starting current, the feedback network in FIG. 1 is arranged to produce increased feedback during the first few cycles of operation. At the start of the first turn-on pulse in a series, the charge on capacitor 22 is zero, thus permitting the full feedback voltage to be applied to the base of transistor 11 through resistor 19. The resulting current places a charge on capacitor 22 that is proportional to the charge produced in the output circuit on capacitor 28. During succeeding turn-on pulses, the charge on capacitor 22 decreases the portion of the feedback voltage which appears across resistor 19, thus reducing the feedback current in proportion to the reduced load current due to the increasing charge on capacitor 28. The charging time constant of resistor 19 and capacitor 22 is slightly longer than the charging time constant of capacitor 28 and its associated resistance in the load circuit, thus insuring increased feedback over a period of time slightly longer than the charge period of capacitor 28. The discharge time constant of capacitor 22 through resistor 20 is slightly less than that of capacitor 28 through resistor 29, thus permitting the feedback circuit to be restored to the start condition more rapidly than the load and permitting rapid recovery in the event of momentary turn-on pulse failure.

The subtraction of the voltage on capacitor 22 from the feedback voltage during the repetitive running condition of the blocking oscillator causes a slight delay of the feedback through resistor 19 and diode 23. Resistor 18 and high-frequency speed-up capacitor 21 provide normal feedback during this interval.

The blocking oscillator shown in FIG. 1 is restored to its quiescent state after each turn-on pulse by a turn-off pulse applied to diode 26. A negative-going turn-off pulse forward biases diode 26 and reduces the base potential of transistor 11 until the blocking oscillator shuts itself off. The turn-off time of the transistor tends to be limited by charge carrier storage effects if the transistor has been permitted to go into saturation. If, on the other hand, the collector voltage of transistor 11 is checked a few volts short of the saturation point, such storage effects do not occur and the turn-off time is held to a minimum. As has already been pointed out, a number of arrangements for keeping transistors in transistor switching circuits out of saturation are known but all impose side requirements which it is desirable to avoid.

In accordance with the invention, a diode 31 is connected to clamp feedback winding 17 of transformer 13 to the ungrounded side of collector voltage supply source 14. Transformer 13 has a turns ratio greater than unity from collector winding 12 to feedback winding 17, or stated conversely, it has a turns ratio less than unity from feedback winding 17 to collector winding 12. Diode 31 is poled oppositely to collector voltage source 14.

In operation, diode 31 limits the voltage on feedback winding 17 to that of source 14. This limit is coupled to the collector electrode of transistor 11 through transformer 13 and serves to check the voltage swing on the collector electrode at something less than the full voltage of source 14. The potential between the collector and emitter electrodes of transistor 11 is thus never permitted to fall below a predetermined minimum, the actual limit being determined primarily by the difference between the voltage of source 14 and the limit of the voltage across collector winding 12 of transformer 13 imposed by the transformer turns ratio. Transistor 11 is kept out of saturation at all times, as illustrated in the third line of FIG. 2, and short turn-off times are assured with a minimum of circuit complexity. No additional power supply is needed for clamping purposes and all clamp current is returned to source 14 in order to decrease the current drain from it.

By way of example, the following elements and voltages may be employed in the embodiment of the invention illustrated in FIG. 1:

| | |
|---|---|
| Transistor 11 | Western Electric 21C. |
| Transformer 13 | 13:18 turns ratio from winding 12 to winding 17. |
| Voltage source 14 | 22 volts positive. |
| Resistor 15 | 1,500 ohms. |
| Resistor 16 | 18,000 ohms. |
| Resistor 18 | 9,000 ohms. |
| Resistor 19 | 1,000 ohms. |
| Resistor 20 | 15,000 ohms. |
| Capacitor 21 | 22 microfarads. |
| Capacitor 22 | 5,600 micromicrofarads. |
| Diode 23 | Western Electric 441A. |
| Resistor 24 | 13,000 ohms. |
| Diode 25 | Western Electric 441A. |
| Diode 26 | Western Electric 441A. |
| Capacitor 28 | .10 microfarad. |
| Resistor 29 | 820 ohms. |
| Resistor 30 | 15 ohms. |
| Diode 31 | Western Electric 441A. |
| Turn-on pulse excursion | From 2 volts negative to 5 volts positive. |
| Turn-off pulse excursion | From 2 volts positive to 5 volts negative. |
| Minimum collector voltage | 5 volts positive. |

As an alternative to the arrangement illustrated in FIG. 1, transistor 11 may be kept out of saturation in accordance with the invention by using output winding 27 instead of feedback winding 17 to provide the collector voltage catching function. With one side of output winding 17 grounded, the other side is returned through diode 31 to the ungrounded side of source 14. Diode 31 is poled as in FIG. 1.

It is to be understood that the above-described arrangements are illustrative of the application of the principles of the invention. Numerous other arrangements may be devised by those skilled in the art without departing from the spirit and scope of the invention.

What is claimed is:

1. A blocking oscillator which comprises a transistor having an emitter electrode, a collector electrode, and a base electrode, a source of direct collector potential, a transformer having at least a collector winding and a feedback winding, means connecting said collector winding directly in series between said collector electrode and one side of said source without intervening impedance, means connecting said emitter electrode directly to the other side of said source without intervening impedance, said source being poled in the direction of positive current flow between said collector and emitter electrodes, means connecting said feedback winding between said base and emitter electrodes to provide positive feedback from said collector electrode to said base electrode, and means clamping one end of a winding of said transformer other than said collector winding to the junction between said collector winding and said source to maintain at least a predetermined potential difference between said collector and emitter electrodes at all times, thereby keeping said transistor out of saturation, the turns ratio of said transformer from said clamped transformer winding to said collector winding being less than unity.

2. A blocking oscillator which comprises a transistor hiving an emitter electrode, a collector electrode, and a base electrode, a source of direct collector potential, a transformer having at least a collector winding and a feedback winding, means connecting said collector winding directly in series between said collector electrode and one side of said source without intervening impedance, means connecting said emitter electrode directly to the other side of said source without intervening impedance, said source being poled in the direction of positive current flow between said collector and emitter electrodes, means connecting said feedback winding between said base and emitter electrodes to provide positive feedback from said collector electrode to said base electrode, and a diode poled oppositely from said source connected from the end of a winding of said transformer other than said collector winding to the junction between said collector winding and said source to maintain at least a predetermined potential difference between said collector and emitter electrodes at all times, thereby keeping said transistor out of saturation, the turns ratio of said transformer from said last-mentioned winding to said collector winding being less than unity.

3. A blocking oscillator which comprises a transistor having an emitter electrode, a collector electrode, and a base electrode, a source of direct collector potential, a transformer having at least a collector winding and a feedback winding, means connecting said collector winding directly in series between said collector electrode and one side of said source without intervening impedance, means connecting said emitter electrode directly to the other side of said source without intervening impedance, said source being poled in the direction of positive current flow between said collector and emitter electrodes, means connecting said feedback winding between said base and emitter electrodes to provide positive feedback from said collector electrode to said base electrode, and means clamping the end of said feedback winding nearest said base electrode to the junction between said collector winding and said source to maintain at least a predetermined potential difference between said collector and emitter electrodes at all times, thereby keeping said transistor out of saturation, the turns ratio of said transformer from said feedback winding to said collector winding being less than unity.

4. A blocking oscillator which comprises a transistor having an emitter electrode, a collector electrode, and a base electrode, a source of direct collector potential, a transformer having at least a collector winding and a feedback winding, means connecting said collector winding directly in series between said collector electrode and one side of said source without intervening impedance, means connecting said emitter electrode directly to the other side of said source without intervening impedance, said source being poled in the direction of positive current flow between said collector and emitter electrodes, means connecting said feedback winding between said base and emitter electrodes to provide positive feedback from said collector electrode to said base electrode, and a diode poled oppositely from said source connected from the end of said feedback winding nearest said base electrode to the junction between said collector winding and said source to maintain at least a predetermined potential difference between said collector and emitter electrodes at all times, thereby keeping said transistor out of saturation, the turns ratio of said transformer from said feedback winding to said collector winding being less than unity.

5. A blocking oscillator which comprises a transistor having an emitter electrode, a collector electrode, and a base electrode, a source of direct collector potential, a transformer having a collector winding, a feedback winding and an output winding, means connecting said collector winding directly in series between said collector electrode and one side of said source without intervening impedance, means connecting said emitter electrode directly to the other side of said source without intervening impedance, said source being poled in the direction of positive current flow between said collector and emitter electrodes, a capacitive load connected to said output winding, a network connecting said feedback winding between said base and emitter electrodes to provide positive feedback from said collector electrode to said base electrode, said network including at least one capacitor connected in series between said feedback winding and said base electrode to provide high starting feedback until said capacitive load has been charged and then reduced feedback to minimize power dissipation in said transistor, and means clamping the end of said feedback winding nearest said base electrode to the junction between said collector winding and said source to maintain at least a predetermined potential difference between said collector and emitter electrodes at all times, thereby keeping said transistor out of saturation, the turns ratio of said transformer from said feedback winding to said collector winding being less than unity.

6. A blocking oscillator which comprises a transistor having an emitter electrode, a collector electrode, and a base electrode, a source of direct collector potential, a transformer having a collector winding, a feedback winding, and an output winding, means connecting said collector winding directly in series between said collector electrode and one side of said source without intervening impedance, means connecting said emitter electrode directly to the other side of said source without intervening impedance, said source being poled in the direction of positive current flow between said collector and emitter electrodes, a capacitive load connected to said output winding, a network connecting said feedback winding between said base and emitter electrodes to provide positive feedback from said collector electrode to said base electrode, said network including at least one capacitor connected in series between said feedback winding and said base electrode to provide high starting feedback until said capacitive load has been charged and then reduced feedback to minimize power dissipation in said transistor, and a diode poled oppositely from said source connected from the end of said feedback winding nearest said base electrode to the junction between said collector winding and said source to maintain at least a predetermined potential difference between said collector and emitter electrodes at all times, thereby keeping said transistor out of saturation, the turns ratio of said transformer from said feedback winding to said collector winding being less than unity.

References Cited in the file of this patent

UNITED STATES PATENTS

| | | |
|---|---|---|
| 3,070,758 | Janssen et al. | Dec. 25, 1962 |
| 3,072,802 | Myers et al. | Jan. 8, 1963 |